April 17, 1956

W. H. DU BOIS 2,742,107

BRAKES

Filed Dec. 20, 1950

2 Sheets-Sheet 1

INVENTOR.
WILLIAM H. DuBois
BY
G A Gust
ATTORNEY

April 17, 1956

W. H. DU BOIS 2,742,107

BRAKES

Filed Dec. 20, 1950

2 Sheets-Sheet 2

INVENTOR.
WILLIAM H. DU BOIS
BY
G A Gust
ATTORNEY

United States Patent Office 2,742,107
Patented Apr. 17, 1956

2,742,107
BRAKES

William H. Du Bois, South Bend, Ind., assignor to Bendix Aviation Corporation, South Bend, Ind., a corporation of Delaware Application December 20, 1950, Serial No. 201,788

12 Claims. (Cl. 188—18)

This is a continuation-in-part of application Serial No. 719,486, filed December 31, 1946, now abandoned.

This invention relates to brakes, and particularly to brakes in which the friction elements are moved axially to bring them into engagement with one another.

An object of the present invention is to provide a particularly simple and inexpensive brake which will not sacrifice operating efficiency. The brake is intended primarily for use on light aircraft, where the braking requirements are quite stringent even though the cost and weight must be kept to a minimum.

Another object is to provide a wheel and brake assembly for use on light aircraft, the assembly being light in weight, simple in construction, reliable in operation, and economical to build. In accomplishing this object, a bare minimum of parts are used, with a structural portion of the wheel actually entering into the combination of the brake.

An important feature of the present invention is the provision of a "floating" brake element, which is located between a rotating brake member and a non-rotating brake member, and which is not rotationally keyed to either one of them, thereby permitting the "floating" element to develop any rotational speed from zero to the speed of the rotating member whenever it is frictionally clamped between the rotating and non-rotating members. The "floating" brake element serves as the heat-absorbing member of the brake for transmitting heat from the friction surfaces of the brake to the surrounding air. Elimination of the usual keys for tying the heat-absorbing member to one of the other brake members permits the brake to be constructed at a substantial reduction in cost.

Figure 1:
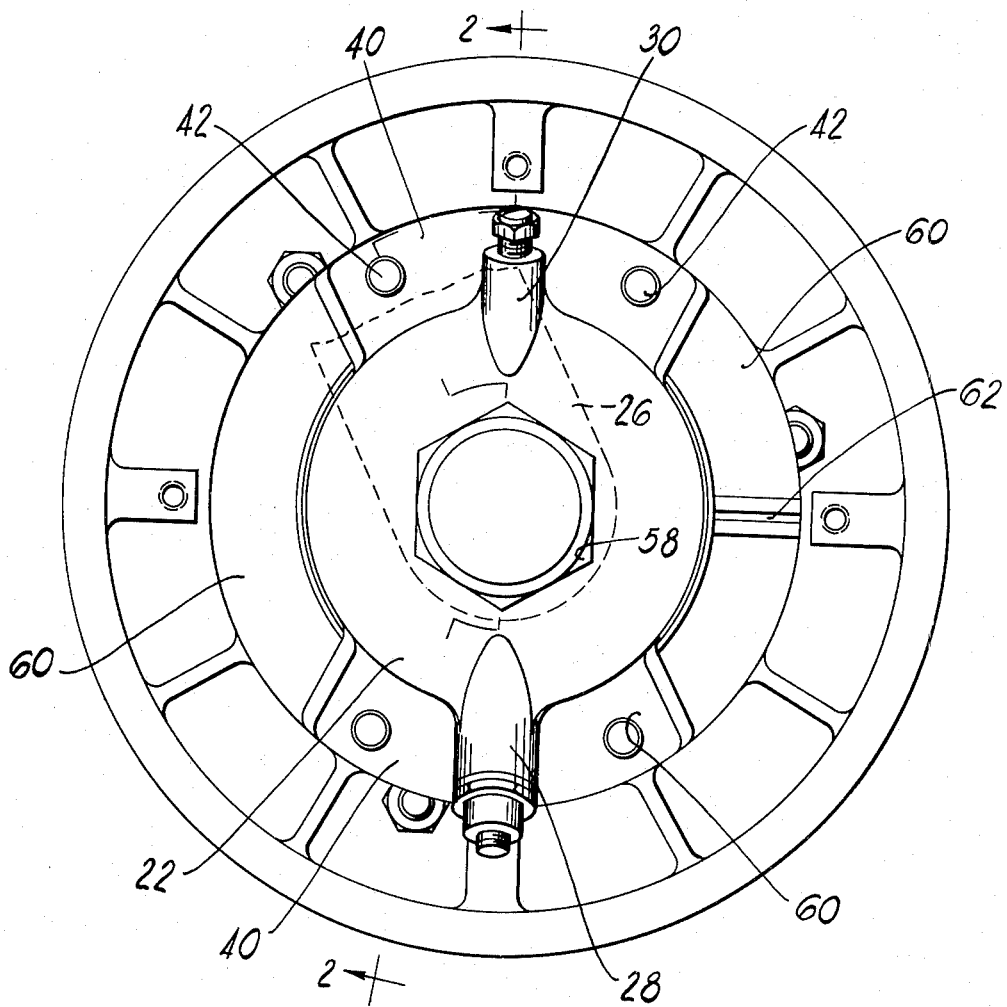
Figure 2:
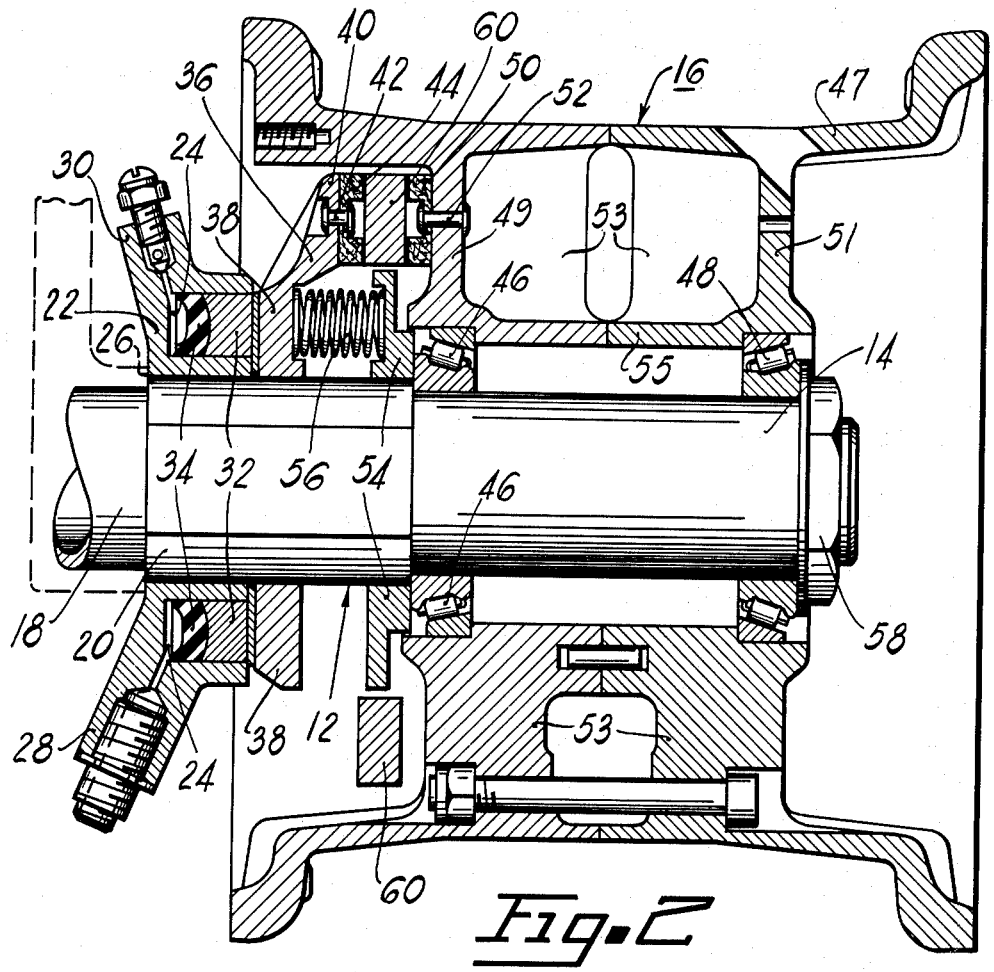

Other objects, advantages, and features of the present invention will become apparent during the following discussion, reference being had therein to the accompanying drawings, in which:

Figure 1 is an end view of a brake, wheel, and axle assembly which embodies the invention; and Figure 2 is a section taken on the line 2—2 of Figure 1, except that the inlet and bleeder fittings are shown in section although missed by the section line 2—2.

The non-rotating axle member 12 of the assembly is formed from a piece of stock having the original shape of a hexagonal prism (or other polygonal prism, such as a prism having a square cross-section, or a prism having an octagonal cross-section). Each end of the hexagonal prism is turned down to a cylindrical form, the cylindrical portion 14 serving as the axle about which the wheel 16 rotates, and the cylindrical portion 18 serving as the part of the axle member which extends into an opening provided in the lower portion of the airplane shock strut. The axle member 12 is preferably hollow, as shown, and may be formed by boring out the center of solid rock, or by using stock which is formed hollow.

The hexagonal portion 20 of the member 12 serves as the support for the non-rotating members of the brake. The annular housing 22, which has an annular chamber 24 for hydraulic fluid, has a hexagoanl center opening which fits over the hexagonal portion 20 of the axle member. Thus the housing 22 is held in a stationary position. Endwise movement of the housing is prevented by engagement of the surface 26 with the side of the shock strut (shown in dotted lines). The housing 22 is provided with an inlet boss 28 and a bleeder boss 30, as shown.

Reciprocable in annular chamber 24 is an annular piston 32, which is provided with a suitable sealing element 34. Admission of fluid under pressure into chamber 24 urges piston 32 toward the right (as seen in Figure 2).

A non-rotatable axially movable pressure plate 36 is mounted on the hexagonal portion of the axle member and engages the piston 32. The pressure plate has an annular center portion 38, and two outwardly extending segmental flanges 40. The center portion 38 has a hexagonal opening which fits the hexagonal portion 20 of the axle member, thereby preventing rotational movement of the pressure plate, while permitting axial movement thereof. In other words, the hexagonal axle serves the same purpose as a key, or spline arrangement, without requiring an additional element, or necessitating additional manufacturing steps.

The faces of the two segmental flanges 40 to have secured thereto, by suitable means, such as rivets 42, brake lining segments 44, which are composed of the usual friction lining material. The lining material is of such composiiton that it possesses the property of being an effective insulator against heat, or stated in other words, a poor conductor of heat. Thus the heats developed at the right-hand or braking surfaces of segments 44 will not carry through, to any appreciable extent, to the metal pressure plate 36 and thereby cause the plate to warp or the liquid in chamber 24 to volatilize.

The wheel 16 is comprised of a rim 47 supported by means of two axially spaced, disk-like metal sides 49 and 51 which are respectively rotatably supported on axle 14 by means of the bearings 46 and 48. The metal used for the sides is usually a light-weight, relatively low melting alloy of aluminum or magnesium. Lateral and radial reinforcement for the wheel is provided by the plurality of circumferentially spaced ribs 53 which are rigidly secured between the sides 49 and 51 and between rim 47 and wheel hub 55. A plurality (usually three) of brake lining segments 50 are attached to the left-hand surface of side 49 by means of rivets 52. These segments 50, as are the segments 44, are composed of materials which make them poor conductors of heat whereby the heat generated at the left-hand or braking surfaces of segments 50 will not penetrate to wheel side 49. This feature is of vital importance, as will become more fully apparent hereafter, because the heats generated by a normal application of the aircraft brake, if applied to only the left surface of side 49, would produce violet strains and stresses resulting in warpage of side 49 and the consequent failure of wheel 16. However, since the lining 50 is an effective insulator against the passage of heat, the wheel side 49 may be utilized as a part of the brake assembly, and more specifically, as a rotating backing plate of the brake against which brake applying pressure is brought to bear. Thus it is seen that by using a part of the wheel as an element of the brake, a simple, inexpensive, and light weight arrangement is made possible.

Mounted on the right end of the hexagonal portion 20 of the axle member is a spacer element 54, which serves the dual function of supporting radially (i. e. vertically) the "floating" element of the brake, and of providing a base for a plurality (in the illustrated brake, three) of compression return springs 56 which urge the pressure plate 36 toward retracted position. The spacer element 54 is prevented from moving toward the right by engagement with the inner race of bearing 46, said inner race being prevented from moving toward the left by means of the shoulder provided on the axle member where the cylindrical portion 14 joins the hexagonal portion 20. The bearings 46 and 48 are adjusted axially by means of the threaded cap 58, which is screwed onto the end of the axle.

A "floating" brake element 60 is located between the friction lining 44 of the pressure plate and the friction lining 50 of the wheel. The brake element 60 is a relatively thick metal disk, preferably steel, which is supported in the brake by the spacer element 54. Sufficient radial clearance exists between brake element 60 and spacer element 54 to allow the brake element to move freely axially or rotate, but at the same time the clearance is not excessive. That is, the clearance between elements 54 and 60 is predetermined and is such that it is possible for air to circulate therebetween. The brake element 60 is not keyed either to the rotating wheel or to the non-rotating axle. Therefore, it is free to develop its own rotational speed whenever it is frictionally clamped or pressed between the pressure plate and the wheel. This speed may be anything from zero to the full speed of the wheel. Furthermore, the speed of the "floating" element 60 may fluctuate widely during a given brake application. In other words, it may alternately increase and decrease if its two friction surfaces alternate in slipping and holding.

The action of the metal disk 60 is dependent upon the friction characteristics of the linings 44 and 50 and in the present instance is believed to be due to the use of lining material having a coefficient of friction which will remain substantially constant throughout the operating range of temperatures encountered in braking or which will increase in coefficient of friction with an increase in lining temperature. Stated in other words, the lining frictional characteristics should be such that upon frictionally clamping the element 60 between the linings 44 and 50, the element 60 will rotate in such a manner as to provide substantially an equal amount of slippage on each braking surface of the element during any single braking cycle.

One satisfactory lining arrangement results in the element 60 alternately rotating with the lining 50 and slipping with the lining 44 and the converse of holding stationary on the lining 44 and slipping with the lining 50. For example, during brake release, assume that the element 60 normally rests against lining 44 with the static friction therebetween holding the element stationary. Upon initial application of the brake, the now stationary element 60 is brought into engagement with the rotating lining 50 with the result that the only slippage occurs between the lining 50 and the element 60. This condition will persist until the dynamic friction of the slipping surfaces exceeds the static friction holding the element 60 stationary, at which time the element 60 will tend to rotate with the lining 50. Thus, in one possible embodiment of this invention, depending upon the temperature of the engaging surfaces and the consequent coefficients of friction, the element 60 will alternate between speeds of rotation from zero to that of the wheel.

The brake element 60 is intended primarily as a heat-absorbing or heat transmitting member. Since it is not keyed to either the rotating or non-rotating parts of the brake, it does not increase the number of effective friction surfaces. In other words it does not provide a different leverage ratio from that which would exist if the pressure plate directly engaged the wheel. However, such an arrangement would be unsatisfactory because of the absence of a heat-absorbing member. If the pressure plate and wheel were in direct engagement, they would tend to warp, due to the action of the heat on one side only. With the illustrated arrangement, the pressure plate and wheel are insulated from the extreme heat by the lining segments, and the heat is absorbed by both sides of the "floating" brake element, thereby avoiding warping of the floating element due to unequal heating. To further avoid any warpage, the brake element 60 may be split, as at 62, to permit free expansion and contraction as the brake becomes heated and cools.

As mentioned above, the element 60 may be characterized as a heat absorbing or heat-transmitting member, one of its intended purposes being to transmit the heats generated upon brake application to the surrounding air thereby bleeding off or taking away heat which would otherwise cause warpage of the wheel or brake parts. That is, for any given temperature of the surfaces between the linings 44 and 50 and element 60, more heat will flow into the element 60 than through the linings for a given period of time since the thermal conductivity of element 60 is higher than that of the lining. Since the linings 44 and 50 are poor conductors of heat, the greater part of any heat generated at the friction surfaces will be transmitted through brake element 60 to the surrounding air rather than through friction lining 50 to wheel side 49. It will be noted that a large part of the brake element 60 is left exposed on both sides to the surrounding air, between the ends of the segmental flanges 40 and brake lining segments 50, to permit efficient cooling of the brake during operation.

By avoiding the use of keys or splines in connection with the brake element 60, the expense of the construction is reduced considerably, while at the same time the usefulness of the brake element 60 as a heat-absorbing and heat-transferring (to the cooling air) member is fully realized.

Although a certain particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A wheel and brake assembly comprising an axle, a wheel mounted thereon having a rim and two axially spaced disk-like supporting sides, a plurality of strengthening ribs which serve to space said sides apart, said sides and said ribs being composed of light-weight, low melting material, friction lining material secured to a portion of the outer circumferential surface of one side of the wheel and rotatable therewith, a non-rotatable pressure plate having radially-extending segmental flanges mounted in juxtaposition with said lining material and being capable of axial movement, friction lining material secured to the surface of said pressure plate facing said first mentioned lining material, an axially movable floating metal disk located between the friction lining of the pressure plate and the friction lining of the side of the wheel, said disk having a high thermal conductivity with respect to said lining material so that heat formed between the friction linings and the disk will flow into the disk, said wheel and said disk being disconnected rotationally thereby permitting the disk to develop any rotational speed from zero to the speed of the wheel whenever said pressure plate is moved to frictionally clamp said disk against the lining rotatable with said wheel, and means secured to said axle for preventing radial displacement of said floating disk.

2. A wheel and brake assembly comprising an axle, a wheel supported thereon having two axially spaced disk-like supporting sides, said sides composed of light-weight, low melting material, one of said sides serving as a rotatable brake backing plate and having friction lining material secured to the outer surface thereof, said lining material being a poor conductor of heat, a non-rotatable pressure plate mounted in juxtaposition with said lining material and being capable of axial movement, friction lining material secured to the surface of said pressure plate facing said first mentioned lining material, said pressure plate lining also being a poor conductor of heat, an axially movable floating metal disk having a high thermal conductivity with respect to said lining material and being located between the friction lining of the pressure plate and the friction lining of the side of the wheel, said disk being disconnected rotationally from the wheel thereby permitting it to develop any rotational speed from zero to the speed of the wheel whenever said pressure plate is moved to frictionally clamp said disk against the lining on said one wheel side, and means connected to said axle for preventing radial displacement of said floating disk.

3. A wheel and brake assembly comprising a wheel, friction lining material secured to the outer periphery of one side of said wheel and rotatable therewith, said lining material being a poor conductor of heat, a non-rotatable pressure plate mounted in juxtaposition with said lining material and being capable of axial movement, friction lining material secured to the surface of said pressure plate facing said first mentioned lining material, said pressure plate lining also being a poor conductor of heat, and an axially movable floating metal disk located between the friction lining of the pressure plate and the friction lining of the side of the wheel, said disk being disconnected rotationally from the wheel thereby permitting it to develop any rotational speed from zero to the speed of the wheel whenever said pressure plate is moved to frictionally clamp said disk against the lining rotatable with said wheel, said disk also being composed of material having a high thermal conductivity relative to said lining material so that said disk acts as a heat reservoir and the greater amount of heat formed by friction between the lining material and the disk will flow into the latter.

4. A wheel and brake assembly comprising a wheel, friction lining material secured to the outer periphery of one side of the wheel and rotatable therewith, a non-rotatable pressure plate mounted in juxtaposition with said lining material and being capable of axial movement, friction lining material secured to the surface of said pressure plate facing said first mentioned lining material, and an axially movable floating metal disk located between the friction lining of the pressure plate and the friction lining of the side of the wheel, said disk being disconnected rotationally from the wheel and having a high thermal conductivity with respect to said lining material, said lining materials having coefficients of friction which will permit said disk to develop any rotational speed from zero to the speed of the wheel whenever said pressure plate is moved to frictionally clamp said disk against the lining on the wheel.

5. A wheel and brake assembly comprising a wheel, friction lining material secured to the outer periphery of one side of the wheel and rotatable therewith, a non-rotatable pressure plate mounted in juxtaposition with said lining material and being capable of axial movement, friction lining material secured to the surface of said pressure plate facing said first mentioned lining material, and an axially movable floating metal disk located between the friction lining of the pressure plate and the friction lining of the side of the wheel, said disk being disconnected rotationally from the wheel, the material of said disk and said lining materials having heat characteristics which prevent the communication of heats from the braking surfaces of the lining materials to the pressure plate and wheel side and cause said heat to flow into said disk, said lining materials also being of such character as to permit said disk to alternate in speed of rotation from zero to that of the wheel whenever said pressure plate is moved to frictionally clamp said disk against the lining material on said wheel.

6. A wheel and brake assembly comprising a wheel, a heat-insulating type of friction member carried by the outer peripheral portion of one side of said wheel and rotatable therewith, a non-rotatable pressure plate cooperatively mounted with respect to said friction member and capable of axial movement, a friction surface provided on the side of said pressure plate facing said friction member, and an axially movable disk located between said friction surface and said friction member, said disk being disconnected rotationally from said wheel and being formed of material having high heat-absorbing characteristics so that the greater part of any heat formed by friction between said friction member and said disk will flow into the latter, said disk being capable of alternating in rotational speed from zero to the speed of the wheel whenever it is frictionally clamped between the rotating friction member and said friction surface.

7. A wheel and brake assembly comprising a wheel, a heat-insulating type of friction member carried by the outer peripheral portion of one side of said wheel and rotatable therewith, a non-rotatable pressure plate cooperatively mounted with respect to said friction member and capable of axial movement, a friction surface provided on the side of said pressure plate facing said friction member, and an axially movable disk located between said friction surface and said friction member, said disk being disconnected rotationally from said wheel and being formed of material having high heat-absorbing characteristics with respect to said friction member, said disk being capable of developing any rotational speed from zero to the speed of the wheel whenever it is frictionally clamped between the friction member and the pressure plate.

8. A wheel and brake assembly comprising a wheel, friction lining material secured to one side of the wheel and rotatable therewith, a non-rotatable pressure plate mounted in juxtaposition with said lining material and being capable of axial movement, friction lining material secured to the surface of said pressure plate facing said first mentioned lining material, and an axially movable floating metal disk located between the friction lining of the pressure plate and the friction lining of the side of the wheel, said disk being disconnected rotationally from the wheel, said lining materials having heat-insulating characteristics with respect to said disk which prevent the communication of heats from the braking surfaces of the lining materials to the pressure plate and wheel side and cause said heat to flow into said disk.

9. A wheel and brake assembly comprising a wheel, friction lining material secured to one side of the wheel and rotatable therewith, a non-rotatable pressure plate mounted in juxtaposition with said lining material and being capable of axial movement, friction lining material secured to the surface of said pressure plate facing said first mentioned lining material, and an axially movable floating member having high heat-absorbing characteristics with respect to said lining material and located between the friction lining of the pressure plate and the friction lining of the side of the wheel, said member being disconnected rotationally from the wheel, said lining materials being poor conductors of heat and having coefficients of friction which will permit said member alternately to develop any rotational speed from zero to the speed of the wheel whenever said pressure plate is moved to frictionally clamp said member against the lining on the wheel.

10. For use in cooperation with a non-rotating axle and a wheel rotatably mounted on said axle, a brake comprising a heat-insulating type of friction member carried by one side of the wheel, a pressure plate so mounted on the axle as to be non-rotatable but axially movable, and an axially movable disk located between the pressure plate and the friction member, said disk being disconnected rotationally from both the axle and the wheel, thereby permitting it to develop any rotational speed from zero to the speed of the wheel whenever it is frictionally clamped between the friction member and the pressure plate, said disk being formed of material having high heat-absorbing characteristics with respect to said friction member.

11. A wheel and brake assembly comprising a wheel, a plurality of heat-insulating friction members circumferentially spaced on one side of said wheel and rotatable therewith, a segmented non-rotatable pressure plate cooperatively mounted with respect to said friction members and capable of axial movement, a friction surface provided on the side of said pressure plate facing said friction members, and an axially movable disk located between said friction members and said friction surface and exposed throughout at least part of its arcuate length to the atmosphere, said disk being disconnected rotationally from said wheel and being formed of material having a high heat transmitting capacity with respect to said friction members and friction surface.

12. A wheel and brake assembly comprising a wheel, a plurality of heat-insulating friction members circumferentially spaced on one side of said wheel and rotatable therewith, a segmented non-rotatable pressure plate cooperatively mounted with respect to said friction members and capable of axial movement, a friction surface provided on the side of said pressure plate facing said friction members, and an axially movable disk located between said friction members and said friction surface and exposed throughout at least part of its arcuate length to the atmosphere, said disk being disconnected rotationally from said wheel and being formed of material having a high heat transmitting capacity with respect to said friction members and friction surface, said disk also being split at one point in its circumference to permit its thermal expansion and contraction.

References Cited in the file of this patent

UNITED STATES PATENTS

| | | |
|---|---|---|
| 173,384 | Osgood | Feb. 8, 1876 |
| 1,673,713 | Smith | June 12, 1928 |
| 1,990,510 | Winkler | Feb. 12, 1935 |
| 2,094,065 | Frank | Sept. 28, 1937 |
| 2,105,867 | Stewart | Jan. 18, 1938 |
| 2,118,733 | Line | May 24, 1938 |
| 2,375,855 | Lambert | May 15, 1945 |
| 2,381,393 | Brown | Aug. 7, 1945 |
| 2,417,855 | Barish | Mar. 25, 1947 |